United States Patent
Hidaka (10) Patent No.: US 10,496,060 B2
(45) Date of Patent: Dec. 3, 2019

(54) POWER MANAGEMENT SYSTEM AND METHOD FOR POWER MANAGEMENT

(71) Applicant: KYOCERA CORPORATION, Kyoto-shi, Kyoto (JP)

(72) Inventor: Hiroyuki Hidaka, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 213 days.

(21) Appl. No.: 15/129,410

(22) PCT Filed: Mar. 27, 2015

(86) PCT No.: PCT/JP2015/001805
§ 371 (c)(1),
(2) Date: Sep. 26, 2016

(87) PCT Pub. No.: WO2015/146200
PCT Pub. Date: Oct. 1, 2015

(65) Prior Publication Data
US 2017/0102677 A1    Apr. 13, 2017

(30) Foreign Application Priority Data

Mar. 27, 2014  (JP) ................................ 2014-066624

(51) Int. Cl.
*G05B 15/02*    (2006.01)
*H02J 3/32*    (2006.01)
(Continued)

(52) U.S. Cl.
CPC ............... *G05B 15/02* (2013.01); *H02J 3/32* (2013.01); *H02J 3/46* (2013.01); *H02J 7/0068* (2013.01); *H02J 2003/146* (2013.01)

(58) Field of Classification Search
None
See application file for complete search history.

(56) References Cited

U.S. PATENT DOCUMENTS 8,155,795 B2 * 4/2012 Ohuchi .................... H02J 3/14
                                                              700/286
8,330,415 B2 * 12/2012 Sato ........................ B60L 3/12
                                                              320/109
(Continued)

FOREIGN PATENT DOCUMENTS

JP    2003-032899 A    1/2003
JP    2012-194935 A   10/2012
(Continued)

OTHER PUBLICATIONS

Koeppel et al. "Using storage devices for compensating uncertainties caused by non-dispatchable generators", 2006 IEEE, pp. 1-8.*
(Continued)

*Primary Examiner* — Van H Nguyen
(74) *Attorney, Agent, or Firm* — Procopio Cory Hargreaves and Savitch LLP (57) ABSTRACT

In a power management system, a server determines a planned value of demand for power in a consumer's facility, and a controller adjusts a supply/demand balance of power in the consumer's facility by charging/discharging a storage battery in accordance with the planned value. The server provides the planned value to the controller, and the controller calculates a predicted value of actual power usage in the consumer's facility at a unit time expiration, calculates an extent of fluctuation of the planned value and the predicted value, and selects a charging/discharging control algorithm to use for the storage battery for the following day based on the extent of fluctuation.

15 Claims, 7 Drawing Sheets

(51) Int. Cl.
*H02J 3/46* (2006.01)
*H02J 7/00* (2006.01)
*H02J 3/14* (2006.01)

(56) References Cited

U.S. PATENT DOCUMENTS

| | | | | |
|---|---|---|---|---|
| 9,035,493 | B2* | 5/2015 | Arata | H02J 3/32 |
| | | | | 307/46 |
| 9,092,832 | B2* | 7/2015 | Osogami | G06Q 10/04 |
| 9,196,010 | B2 | 11/2015 | Osogami | |
| 9,300,156 | B2* | 3/2016 | Nishibayashi | H02J 7/007 |
| 9,906,020 | B2* | 2/2018 | Yajima | H02J 1/14 |
| 2009/0018705 | A1* | 1/2009 | Ouchi | H02J 3/14 |
| | | | | 700/291 |
| 2009/0234511 | A1* | 9/2009 | Ouchi | H02J 3/14 |
| | | | | 700/291 |
| 2012/0038212 | A1* | 2/2012 | Arata | H02J 3/32 |
| | | | | 307/46 |
| 2012/0239453 | A1 | 9/2012 | Osogami | |
| 2012/0253537 | A1* | 10/2012 | Okuda | H02J 3/32 |
| | | | | 700/296 |
| 2013/0346345 | A1* | 12/2013 | Osogami | G06Q 10/04 |
| | | | | 705/412 |
| 2014/0042978 | A1* | 2/2014 | Nishibayashi | H02J 7/007 |
| | | | | 320/134 |

FOREIGN PATENT DOCUMENTS

| | | |
|---|---|---|
| JP | 2012-205454 A | 10/2012 |
| JP | 2013-031283 A | 2/2013 |
| JP | 2013-118725 A | 6/2013 |

OTHER PUBLICATIONS

Omran et al. "Investigation of Methods for Reduction of Power Fluctuations Generated From Large Grid-Connected Photovoltaic Systems", 2010 IEEE, pp. 318-327.*
Kato et al. "Adaptive Storage Battery Management based on the Energy on Demand Protocol", 2012 IEEE, pp. 43-48.*
Written Opinion of the International Search Authority issued by the Japanese Patent Office dated Jun. 16, 2016 for International application No. PCT/JP2015/001805.
International Search Report dated Jun. 16, 2015 issued by Japan Patent Office for International application No. PCT/JP2015/001805.
Office Action dated Jan. 9, 2018 issued in counterpart Japanese Application No. 2017-128097.

* cited by examiner

| No. | Time | Planned value |
|---|---|---|
| 1 | 0:00 | 4.00 kWh |
| 2 | 0:30 | 4.00 kWh |
| 3 | 1:00 | 4.00 kWh |
| 4 | 1:30 | 4.00 kWh |
| 5 | 2:00 | 4.00 kWh |
| 6 | 2:30 | 4.00 kWh |
| 7 | 3:00 | 4.00 kWh |
| ⋮ | ⋮ | ⋮ |
| 33 | 16:00 | 25.00 kWh |
| 34 | 16:30 | 25.00 kWh |
| 35 | 17:00 | 33.00 kWh |
| 36 | 17:30 | 33.00 kWh |
| 37 | 18:00 | 34.00 kWh |
| 38 | 18:30 | 34.00 kWh |
| 39 | 19:00 | 34.00 kWh |
| ⋮ | ⋮ | ⋮ |
| 48 | 23:30 | 4.00 kWh |

FIG. 3

| No. | Time | Each unit time slot | ... | 12 H | 24 H |
|---|---|---|---|---|---|
| 1 | 0:00 | 0.00 kW | ... | 1.21 kW | 2.35 kW |
| 2 | 0:30 | 0.00 kW | ... | — | — |
| 3 | 1:00 | −0.05 kW | ... | — | — |
| 4 | 1:30 | 0.05 kW | ... | — | — |
| 5 | 2:00 | −0.04 kW | ... | — | — |
| 6 | 2:30 | 0.03 kW | ... | — | — |
| 7 | 3:00 | 0.05 kW | ... | — | — |
| ⋮ | ⋮ | ⋮ | ⋮ | ⋮ | ⋮ |
| 25 | 12:00 | 2.00 kW | ... | 3.49 kW | — |
| 26 | 12:30 | 2.10 kW | ... | — | — |
| 27 | 13:00 | 2.50 kW | ... | — | — |
| 28 | 13:30 | 3.00 kW | ... | — | — |
| 29 | 14:00 | 3.20 kW | ... | — | — |
| 30 | 14:30 | 0.20 kW | ... | — | — |
| 31 | 15:00 | −2.10 kW | ... | — | — |
| ⋮ | ⋮ | ⋮ | ⋮ | ⋮ | ⋮ |
| 48 | 23:30 | 0.01 kW | ... | — | — |

FIG. 4

| No. | Extent of fluctuation ± kW | Algorithm |
|---|---|---|
| 1 | 0.50 kW | A |
| 2 | 0.75 kW | A |
| 3 | 1.00 kW | A |
| 4 | 1.25 kW | A |
| 5 | 1.50 kW | A |
| 6 | 1.75 kW | A |
| 7 | 2.00 kW | A |
| 8 | 2.25 kW | B |
| 9 | 2.50 kW | B |
| 10 | 2.75 kW | B |
| 11 | 3.00 kW | B |
| ⋮ | ⋮ | ⋮ |
| 20 | 5.25 kW | B |

POWER MANAGEMENT SYSTEM AND METHOD FOR POWER MANAGEMENT

CROSS-REFERENCE TO RELATED APPLICATION

This application claims priority to and the benefit of Japanese Patent Application No. 2014-066624 filed Mar. 27, 2014, the entire contents of which are incorporated herein by reference.

TECHNICAL FIELD

This disclosure relates to a power management system, a power management method, and a power management system.

BACKGROUND

The power supply market has been opened as a result of the deregulation of electric utilities, and a power user (consumer) can now supply power not only to general electricity utilities (power companies), but also to specified-scale electricity utilities (electricity utilities). As compared to a power company, however, an electricity utility does not have a large-scale power generation facility or power transmission facility and often does not have a power transmission facility at all. Therefore, since an electricity utility operates while borrowing the facilities of a power company, the electricity utility is required to notify the power company in advance of a planned consumption value (planned value) of power that customers are expected to consume the following day and is required to supply power commensurate with the planned value using the electricity utility's own power generation and separately procured power.

In general, the demand for power on the consumer's side depends not only on the consumer's daily activities but also varies greatly with changes in weather conditions, sudden events, and the like. Due to such weather changes and sudden events, there may be a large difference between the planned value and the actual usage value. In this case, an electricity utility that does not have a large-scale power generation facility incurs a power supply shortage due to a small reserve power supply. Even if a power supply shortage occurs, power from the power company is supplied to the consumer when the power company's power grid is under lease, and therefore the consumer does not suffer from a power shortage. The electricity utility, however, is charged an expensive compensatory payment by the power company. Such compensatory payments are one factor that places a strain on the management of electricity utilities.

SUMMARY

A power management system according to one of the disclosed embodiments is a power management system including:
 a server;
 a storage battery; and
 a controller; wherein
 the server creates a planned value of demand for power that a consumer's facility is expected to consume the following day;
 the controller adjusts a supply/demand balance of power in the consumer's facility by charging/discharging the storage battery in accordance with the planned value;
 the server provides the planned value to the controller; and
 the controller
  calculates a predicted value of actual power usage in the consumer's facility at a unit time expiration;
  calculates an extent of fluctuation of the planned value and the predicted value; and
  selects a charging/discharging control algorithm for the storage battery for the following day based on the extent of fluctuation.

A method for power management according to one of the disclosed embodiments is a method for power management by a power management system,
 the power management system including:
  a server;
  a storage battery; and
  a controller; wherein
 the server creates a planned value of demand for power that a consumer's facility is expected to consume the following day; and
 the controller adjusts a supply/demand balance of power in the consumer's facility by charging/discharging the storage battery in accordance with the planned value;
 the method including:
  the server providing the planned value to the controller; and
  the controller
   calculating a predicted value of actual power usage in the consumer's facility at a unit time expiration;
   calculating an extent of fluctuation of the planned value and the predicted value; and
   selecting a charging/discharging control algorithm for the storage battery for the following day based on the extent of fluctuation.

A power management system according to one of the disclosed embodiments is a power management system including:
 a server;
 a storage battery; and
 the controller; wherein
 the server creates a planned value of demand for power that a consumer's facility is expected to consume the following day; and
 the controller adjusts a supply/demand balance of power in the consumer's facility by charging/discharging the storage battery in accordance with the planned value;
 the controller including:
  a communication interface configured to acquire the planned value from the server; and
  a controller configured to calculate a predicted value of actual power usage in the consumer's facility at a unit time expiration, to calculate an extent of fluctuation of the planned value and the predicted value, and to select a charging/discharging control algorithm to use for the storage battery for the following day based on the extent of fluctuation.

BRIEF DESCRIPTION OF THE DRAWINGS

In the accompanying drawings.

DETAILED DESCRIPTION

With known techniques, it may not be possible to achieve an optimal supply/demand balance, since a limit is placed on the capacity and the rated output of the auxiliary power source. In greater detail, when for example a storage battery is used as the auxiliary power source, adjustment cannot be made via power discharge if there is no remaining battery power. Furthermore, adjustment cannot be made by charging power if the storage battery is already fully charged. Depending on the output capability of the storage battery, it also might not be possible to perform the required power charging and discharging within the demand time period. In other words, when a supply/demand unbalance occurs, the optimal supply/demand balance cannot necessarily be achieved by simply charging or discharging a storage battery to reduce or resolve the unbalance. Hence, at times the compensatory payment cannot sufficiently be reduced.

Therefore, it would be helpful to provide a power management system, a power management method, and a power management system that can perform power control that further reduces compensatory payment.

The following describes one of the disclosed embodiments.

Embodiment

Figure 1:
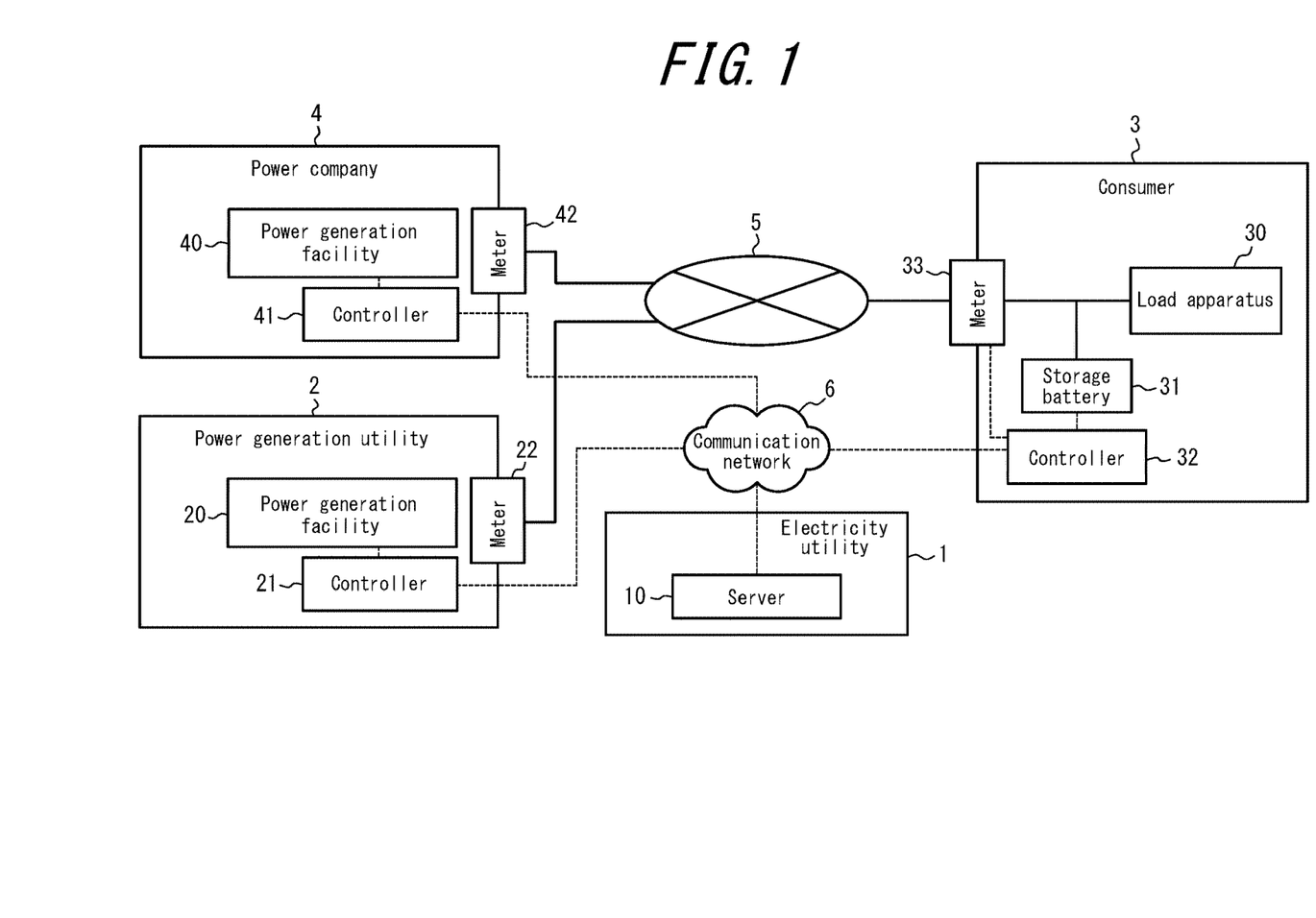
FIG. 1 is a block diagram of a power management system according to one of the disclosed embodiments.

FIG. 1 is a block diagram of a power management system according to one of the disclosed embodiments. The power management system according to this embodiment includes a server 10 at an electricity utility 1; a power generation facility 20, controller 21, and meter 22 at a power generation utility 2; a load apparatus 30, storage battery 31, controller 32, and meter 33 at a consumer (consumer's facility) 3; and a power generation facility 40, controller 41, and meter 42 at a power company 4.

The server 10 at the electricity utility 1 manages procured power (power procured from power generated by the power generation facility 20 of the power generation utility 2 or power procured from power generated by the power generation facility 40 of the power company 4) and power provided to the consumer's facility 3, which is a customer. When the electricity utility 1 has a power generation facility, the server 10 also manages power generated by this power generation facility.

In greater detail, based on factors such as planned activity by the consumer's facility 3 and the weather for the next day, the server 10 creates (predicts) planned values of usage of power (demand for power) that the customer (consumer's facility 3) is expected to consume the following day. The planned value is calculated for each interval of unit time prescribed by the power company. The interval of unit time is, for example, 30 minutes when the demand time period is 30 minutes. The electricity utility 1 notifies the power generation utility 2 or the power company 4 of the planned values via a communication network 6. For example, the power company 4 uses the planned values to formulate the power company's business plan (for example, an operating plan for a power network 5) for the following day. Furthermore, the server 10 provides the planned values to the controller 32 of the consumer's facility 3 via the communication network 6. On the following day, a portion, which is planned based on the planned values, of the power generated by the electricity utility 1, the power generation facility 20 of the power generation utility 2, and the power generation facility 40 of the power company 4 is provided via the power network 5 to the consumer's facility 3. The controller 32 of the consumer's facility 3 controls the storage battery 31 by comparing the actually used power and the received planned values.

The power generation facility 20 at the power generation utility 2 generates thermal power, hydropower, photovoltaic power, or the like. Based on the planned values received from the electricity utility 1, the power generation utility 2 controls the facilities and devices at the power generation utility 2, including the power generation facility 20. The meter 22 measures the power generated by the power generation facility 20.

Each load apparatus 30 in the consumer's facility 3 is a device, facility, or the like that consumes the provided power. The load apparatus 30 may, for example, be a refrigerator, air conditioner, or the like. Based on control by the controller 32, the storage battery 31 charges and discharges power. The meter 33 measures the state of power consumption in the consumer's facility 3. The value of power consumption measured by the meter 33 is used as basic data for calculating the electric bill and is also transmitted to the controller 32 and used in the consumer's facility 3 in a comparison between the power consumption and the planned value. Details on the controller 32 are provided below.

The power generation facility 40 at the power company 4 generates thermal power, hydropower, photovoltaic power, or the like. Based on the planned values received from the electricity utility 1, the power company 4 controls the facilities and devices at the power company 4, including the power generation facility 40. The meter 42 measures the power generated by the power generation facility 40.

The following describes the controller 32 in the consumer's facility 3. The controller 32 communicates with the server 10 of the electricity utility 1 and acquires the planned values. At the dates and times corresponding to the planned values, the controller 32 collects the power consumption values of the consumer's facility 3 measured by the meter 33 for timely knowledge of the power consumption values of the consumer's facility 3. The controller 32 also compares the planned value and the power value collected by the meter 33. Using the power consumption values of the consumer's facility 3 acquired from the meter 33, the controller 32 predicts the power consumption value at the end (unit time expiration) of a unit time period (for example, 30 minutes), and in order to prevent deviation from the planned value and a resulting compensatory payment, or to reduce the compensatory payment, the controller 32 controls power charging and discharging of the storage battery 31 and adjusts the supply/demand balance of power.

Figure 2:
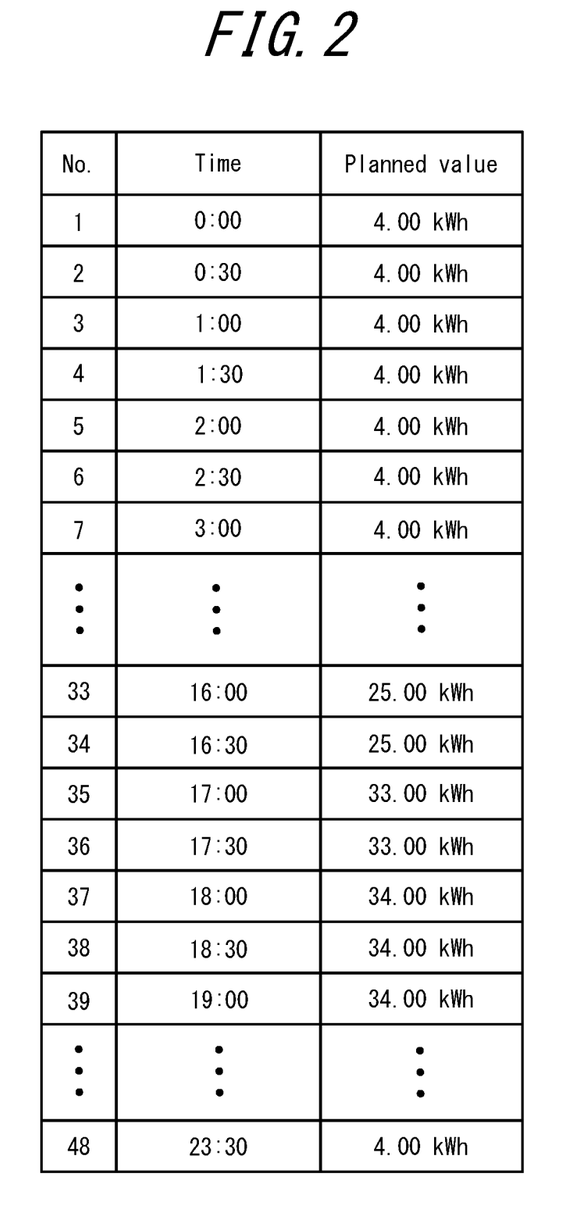
FIG. 2 is an example of a planned value table.

FIG. 2 illustrates an example of planned values. FIG. 2 lists the planned value of power usage at each time in table form (planned value table). The planned value table in FIG. 2 includes planned values for each unit time (for example, 48 planned values in the case of 30 minutes) from 0:00 until 24:00 on the following day. For example, the first line lists a planned value of "4.00 kWh" for the 30 minutes starting at time "0:00" (i.e. the time slot from 0:00 to 0:30). The second line lists a planned value of "4.00 kWh" for the 30 minutes starting at time "0:30" (i.e. the time slot from 0:30 to 1:00). The controller 32 compares the planned value with the current power consumption value acquired from the meter 33 of the consumer's facility 3, calculates whether the power consumption is expected to exceed or fall below the planned value in a unit time, and calculates the approximate amount of compensatory payment. Based on the results of calculation, the controller 32 attempts to improve the supply/demand balance by performing charging/discharging control on the storage battery 31.

When improving the supply/demand balance by using the storage battery 31, the optimal effect on the supply/demand balance cannot necessarily be achieved with control that simply offsets the difference between the planned value and the power consumption value of the consumer's facility 3 acquired from the meter 33 by charging or discharging the storage battery, due to a limit on the capacity and the rated output of the storage battery. When seeking optimal improvement in the supply/demand balance using the storage battery 31, it is effective to switch the appropriate method (algorithm) of charging/discharging the storage battery 31 in response to the pattern of power consumption in the consumer's facility 3 and the planned value, which is the predicted demand for power.

Therefore, based on the power consumption values collected from the meter 33, the controller 32 according to one of the disclosed embodiments calculates the power consumption value at the unit time (for example, after 30 minutes) as a predicted value. Partway through a unit time period (for example, after 15 minutes), the controller 32 judges whether to charge or discharge the storage battery 31 and then charges or discharges the storage battery 31 so that the amount of power consumption in the unit time period approaches the planned value.

Once charging/discharging control for the day is over, the controller 32 calculates the difference between the planned value and the predicted value for each unit time period (extent of fluctuation). The controller 32 stores the calculated extents of fluctuation as a supply/demand table. A general characteristic of this embodiment is that the extent of fluctuation is used to select the algorithm for charging/discharging control of the storage battery 31 for the following day.

Figure 3:
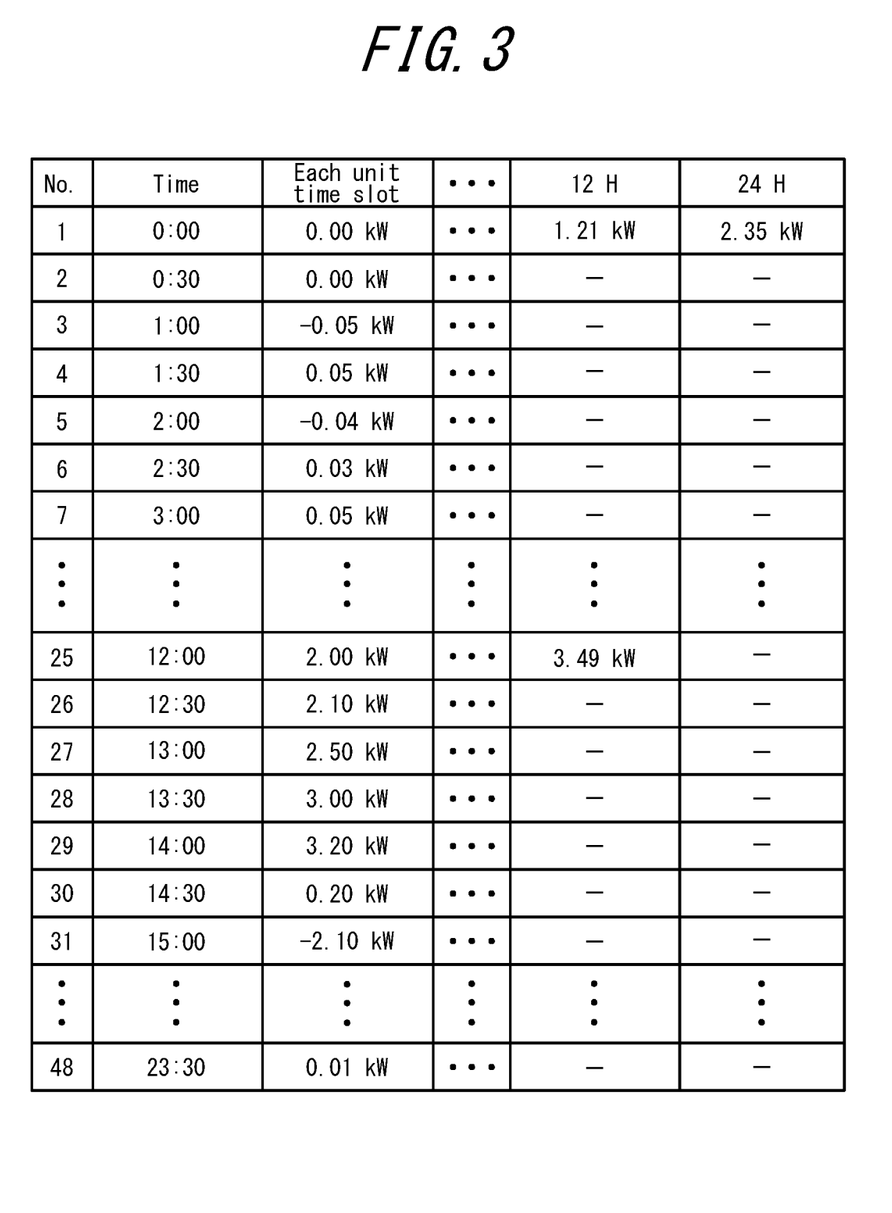
FIG. 3 is an example of a supply/demand table.

FIG. 3 illustrates an example of a supply/demand table. The supply/demand table includes the extent of fluctuation at each time slot. For example, in the case of a unit time of 30 minutes, the first line lists an extent of fluctuation of "0.00 kWh" for the 30 minutes starting at time "0:00" (i.e. the time slot from 0:00 to 0:30). The second line lists an extent of fluctuation of "0.00 kWh" for the 30 minutes starting at time "0:30" (i.e. the time slot from 0:30 to 1:00). The third line lists an extent of fluctuation of "−0.05 kWh" for the 30 minutes starting at time "1:00" (i.e. the time slot from 1:00 to 1:30). In other words, since the planned value at each time slot is 4.00 kWh as illustrated in FIG. 2, the predicted values at the time slots were respectively 4.00 kWh, 4.00 kWh, and 3.95 kWh.

Furthermore, the supply/demand table includes not only the extent of each unit time period as the extent of fluctuation, but also the difference between the average planned value and the average predicted value for every 1 hour, 3 hours, 6 hours, 12 hours, and 24 hours as the extent of fluctuation. For example, the supply/demand table includes the average of the extent of fluctuation over 12 hour periods (0:00 to 12:00 and 12:00 to 24:00) and the average of the extent of fluctuation over a 24 hour period (0:00 to 24:00). As illustrated in FIG. 3, the average of the extent of fluctuation over two 12 hour periods (0:00 to 12:00 and 12:00 to 24:00) is respectively 1.21 kWh and 3.49 kWh. The average of the extent of fluctuation over a 24 hour period is 2.35 kWh.

Figure 4:
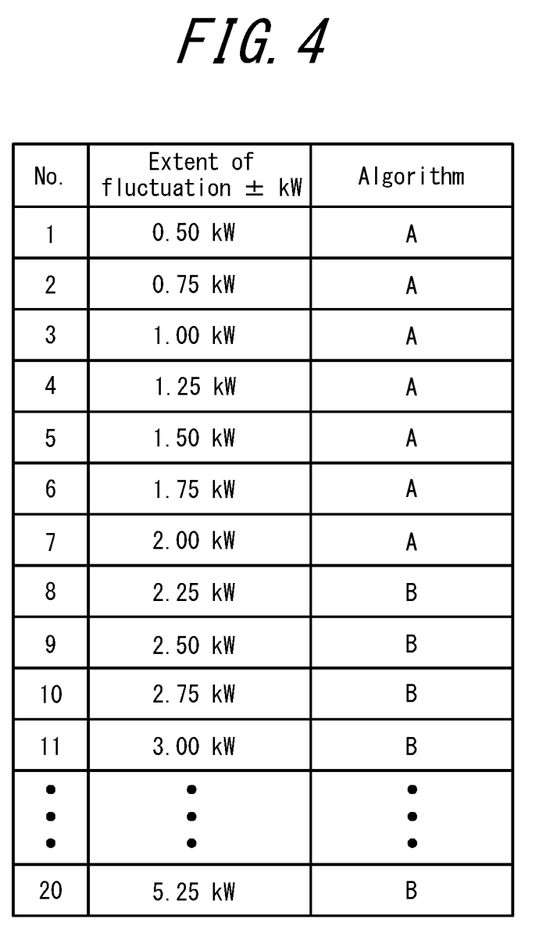
FIG. 4 is an example of an algorithm switching table.

FIG. 4 illustrates an example of an algorithm switching table. The algorithm switching table stores each extent of fluctuation in association with a charging/discharging algorithm, for the storage battery 31, that is highly effective when used for that extent of fluctuation. For example, the first line indicates that algorithm A is selected when the extent of fluctuation is ±0.50 kWh. The eighth line, for example, indicates that algorithm B is selected when the extent of fluctuation is ±2.25 kWh. Based on the supply/demand table and the algorithm switching table, the controller 32 may select the charging/discharging control algorithm of the storage battery 31 in each time slot. The charging/discharging control algorithm may also be selected at each designated time interval, such as 1 hour, 3 hours, 6 hours, 12 hours, and 24 hours.

Algorithm A corresponds to the first algorithm of this disclosure, and algorithm B corresponds to the second algorithm of this disclosure.

Figure 5:
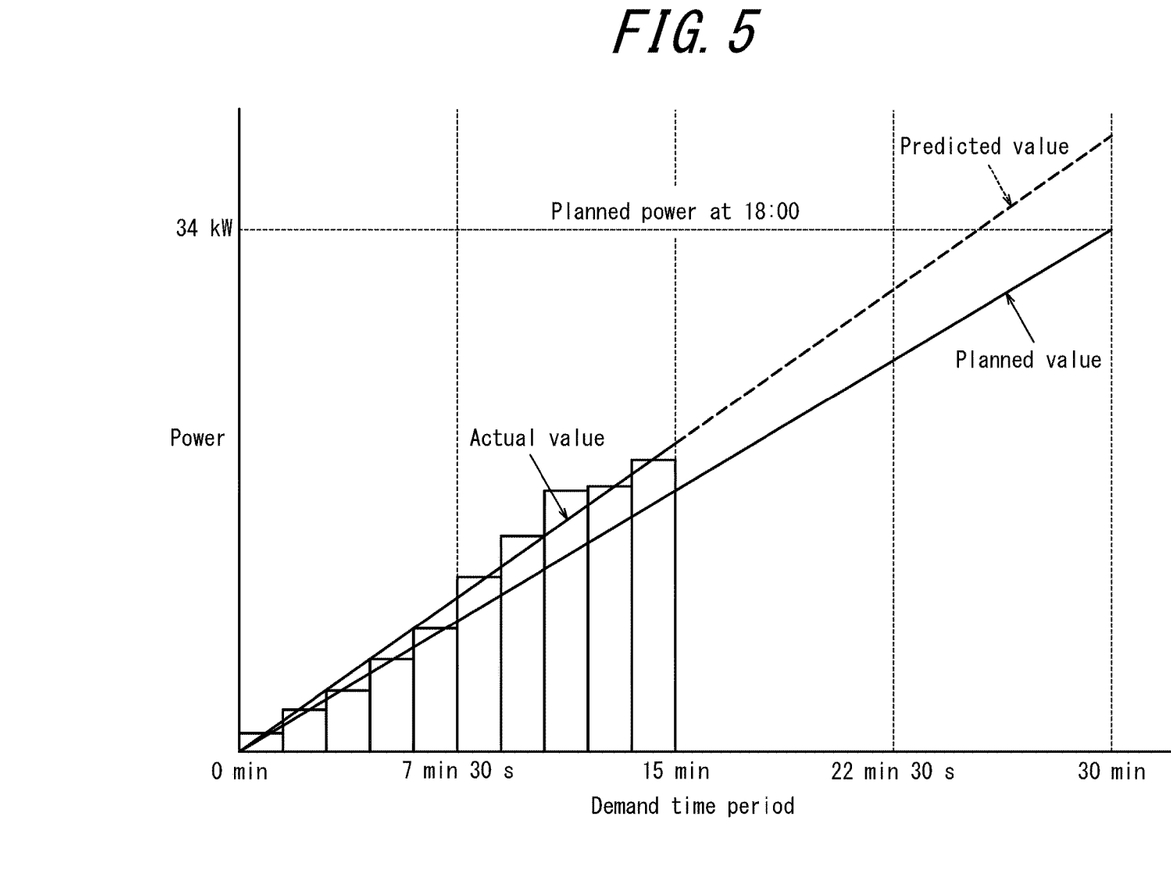
FIG. 5 is a conceptual diagram illustrating the relationship between the planned value and the predicted value.

FIG. 5 is a conceptual diagram illustrating the relationship between the planned value and the predicted value. In FIG. 5, the planned value and the predicted value are illustrated for 18:00 to 18:30. As illustrated in FIG. 5, the planned value is 34 kWh. The bar graph in FIG. 5 illustrates the actual value of power consumption collected from the meter 33 of the consumer's facility 3. In accordance with charging capacity and rated output of the storage battery 31, at an earlier time (18:15 in FIG. 5) than 18:30 (the demand time), the controller 32 uses the actual value to predict the power demand at 18:30 and issues a charge/discharge instruction to the storage battery 31. The extent of fluctuation is the difference between the planned value and the predicted value before performing charging/discharging control.

Figure 6:
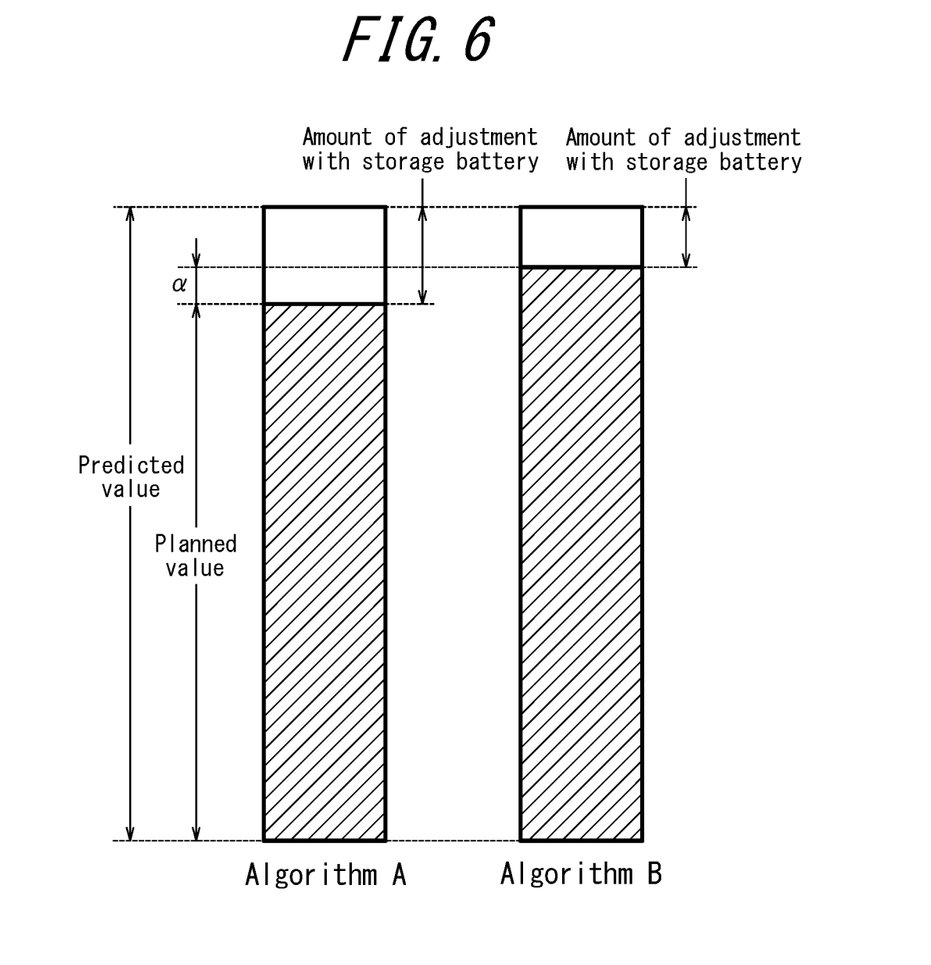
FIG. 6 is a conceptual diagram illustrating algorithms A and B.

FIG. 6 is a conceptual diagram of algorithms A and B. In algorithm A, the difference between the predicted value and the planned value is taken to be the amount of adjustment by the storage battery 31, and the storage battery is caused to charge or discharge so that the actual power usage at the unit time expiration becomes the planned value. On the other hand, in algorithm B, the difference between the predicted value and a value resulting from adding a predetermined value ($\alpha$) to the planned value is taken to be the amount of adjustment by the storage battery 31, and the storage battery is caused to charge or discharge so that the actual power usage at the unit time expiration becomes the planned value with the addition of $\alpha$. The value of $\alpha$ is appropriately determined by factors such as the amount of the compensatory payment as set by the power company 4 and the capacity of the storage battery 31. When the extent of fluctuation is thus greater than a predetermined extent of fluctuation (for example, ±2.25 kWh), the storage battery is caused to charge or discharge so that the actual power usage at the unit time expiration becomes the planned value with the addition of $\alpha$, thus allowing performance of power control that further reduces the compensatory payment.

Figure 7:
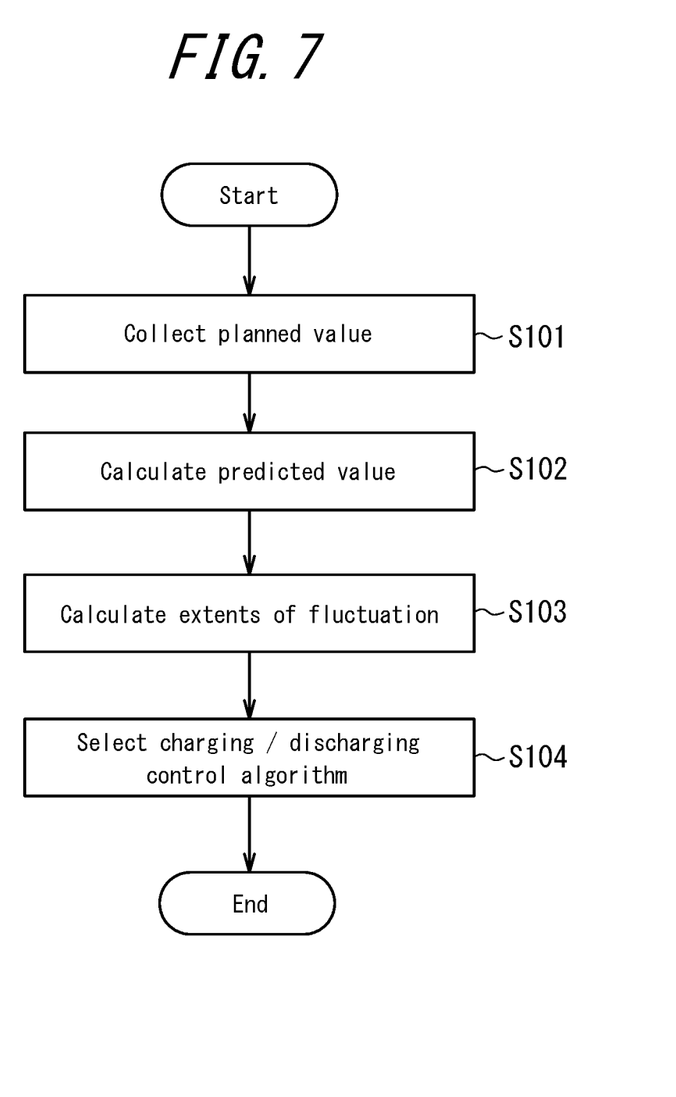
FIG. 7 is a flowchart illustrating operations of a controller in the power management system according to one of the disclosed embodiments.

Next, with reference to the flowchart in FIG. 7, the operations of the controller 32 in the power management system according to one of the disclosed embodiments are described.

First, the controller 32 communicates with the server 10 of the electricity utility 1 and collects (receives) the planned value (step S101).

Next, based on the power consumption values collected from the meter 33, the controller 32 calculates a predicted value corresponding to the planned value, and the controller 32 also performs charging/discharging control to control the storage battery 31 so that the power consumption of the unit time period approaches the planned value (step S102).

The controller 32 repeats step S102 until the day ends.

The controller 32 calculates the extents of fluctuation based on the planned values and the predicted values (step S103).

The controller 32 then selects the charging/discharging control algorithm to use for the storage battery 31 the following day in accordance with the extents of fluctuation (step S104).

In this way, according to one of the disclosed embodiments, the controller 32 selects the charging/discharging algorithm for the storage battery 31 in accordance with the extent of fluctuation of the planned value and the predicted value of power in the consumer's facility 3. Therefore, power control that further reduces the compensatory payment can be performed.

While an example of using the algorithm switching table in FIG. 4 has been described in this embodiment, this disclosure is not limited to this example. For example, the controller 32 may use a threshold, such as 2.25 kWh, without using the algorithm switching table. In this case, the controller 32 uses algorithm A when the absolute value of the extent of fluctuation is less than 2.25 kWh. Conversely, the controller 32 uses algorithm B when the absolute value of the extent of fluctuation is 2.25 kWh or greater.

In this embodiment, based on a certain extent of fluctuation, the charging/discharging algorithm for the corresponding time slot of the following day or for the entire day is switched, but this example is not limiting. For example, based on the moving average of the extent of fluctuation in each time slot over several previous days (such as three days, seven days, or the like), the charging/discharging algorithm for the corresponding time slot of the following day or for the entire day may be switched.

In this embodiment, the supply/demand table illustrated in FIG. 3 includes the average of the extent of fluctuation over a 12 hour period and a 24 hour period as reference data, but these data may be included in the selection of the charging/discharging control algorithm for the storage battery 31.

Although exemplary embodiments have been described with reference to the accompanying drawings, it is to be noted that various changes and modifications will be apparent to those skilled in the art based on this disclosure. Therefore, such changes and modifications are to be understood as included within the scope of this disclosure. For example, the functions and the like included in the various units and steps may be reordered in any logically consistent way. Furthermore, units and steps may be combined into one or divided.

The invention claimed is:

1. A power management system comprising:
a server;
a storage battery; and
a controller;
wherein
the server creates a planned value of demand for power that a consumer's facility is expected to consume the following day;
the controller adjusts a supply/demand balance of power in the consumer's facility by charging/discharging the storage battery in accordance with the planned value;
the server provides the planned value to the controller; and
the controller
calculates a predicted value of actual power usage in the consumer's facility at a unit time expiration;
calculates an extent of fluctuation of the planned value and the predicted value; and
selects a charging/discharging control algorithm, from a plurality of charging/discharging control algorithms, which determines an amount of adjustment for the storage battery for the following day based on the extent of fluctuation.

2. The power management system of claim 1, wherein the planned value comprises a planned value of demand for power in a plurality of time slots; and the controller stores a supply/demand table including an extent of fluctuation of the planned value and the predicted value in each time slot; and switches the charging/discharging control algorithm for the storage battery for the following day in each time slot based on the supply/demand table.

3. The power management system of claim 2, wherein the supply/demand table includes a moving average of the extent of fluctuation over a plurality of previous days in each time slot; and the controller selects the charging/discharging control algorithm for the storage battery for the following day in each time slot based on the moving average.

4. The power management system of claim 1, wherein the controller controls the storage battery with a first algorithm when an absolute value of the extent of fluctuation is less than a threshold and controls the storage battery with a second algorithm when the absolute value of the extent of fluctuation is equal to or greater than the threshold.

5. The power management system of claim 1, wherein the first algorithm is an algorithm that causes the storage battery to charge/discharge so that actual power usage within a unit time becomes the planned value; and the second algorithm is an algorithm that causes the storage battery to charge/discharge so that actual power usage within a unit time becomes a value yielded by adding a predetermined value to the planned value.

6. A method for power management by a power management system, the power management system comprising: a server; a storage battery; and a controller; wherein the server creates a planned value of demand for power that a consumer's facility is expected to consume the following day; and the controller adjusts a supply/demand balance of power in the consumer's facility by charging/discharging the storage battery in accordance with the planned value; the method comprising:
the server providing the planned value to the controller; and
the controller
calculating a predicted value of actual power usage in the consumer's facility at a unit time expiration;
calculating an extent of fluctuation of the planned value and the predicted value; and
selecting a charging/discharging control algorithm, from a plurality of charging/discharging control algorithms, which determines an amount of adjustment for the storage battery for the following day based on the extent of fluctuation.

7. The method of claim 6, wherein the planned value comprises a planned value of demand for power in a plurality of time slots; and the controller stores a supply/demand table including an extent of fluctuation of the planned value and the predicted value in each time slot; and switches the charging/discharging control algorithm for the storage battery for the following day in each time slot based on the supply/demand table.

8. The method of claim 7, wherein the supply/demand table includes a moving average of the extent of fluctuation over a plurality of previous days in each time slot; and the controller selects the charging/discharging control algorithm for the storage battery for the following day in each time slot based on the moving average.

9. The method of claim 6, wherein the controller controls the storage battery with a first algorithm when an absolute value of the extent of fluctuation is less than a threshold and controls the storage battery with a second algorithm when the absolute value of the extent of fluctuation is equal to or greater than the threshold.

10. The method of claim 6, wherein the first algorithm is an algorithm that causes the storage battery to charge/discharge so that actual power usage within a unit time becomes the planned value; and the second algorithm is an algorithm that causes the storage battery to charge/discharge so that actual power usage within a unit time becomes a value yielded by adding a predetermined value to the planned value.

11. A power management system comprising:
   a server;
   a storage battery; and
   the controller;
   wherein
      the server creates a planned value of demand for power that a consumer's facility is expected to consume the following day; and
      the controller adjusts a supply/demand balance of power in the consumer's facility by charging/discharging the storage battery in accordance with the planned value;
   the controller comprising:
      a communication interface configured to acquire the planned value from the server; and
      a controller configured to calculate a predicted value of actual power usage in the consumer's facility at a unit time expiration, to calculate an extent of fluctuation of the planned value and the predicted value, and to select a charging/discharging control algorithm, from a plurality of charging/discharging control algorithms, which determines an amount of adjustment to use for the storage battery for the following day based on the extent of fluctuation.

12. The power management system of claim 11, wherein the planned value comprises a planned value of demand for power in a plurality of time slots; and the controller stores a supply/demand table including an extent of fluctuation of the planned value and the predicted value in each time slot; and switches the charging/discharging control algorithm for the storage battery for the following day in each time slot based on the supply/demand table.

13. The power management system of claim 12, wherein the supply/demand table includes a moving average of the extent of fluctuation over a plurality of previous days in each time slot; and the controller selects the charging/discharging control algorithm for the storage battery for the following day in each time slot based on the moving average.

14. The power management system of claim 11, wherein the controller controls the storage battery with a first algorithm when an absolute value of the extent of fluctuation is less than a threshold and controls the storage battery with a second algorithm when the absolute value of the extent of fluctuation is equal to or greater than the threshold.

15. The power management system of claim 11, wherein the first algorithm is an algorithm that causes the storage battery to charge/discharge so that actual power usage within a unit time becomes the planned value; and the second algorithm is an algorithm that causes the storage battery to charge/discharge so that actual power usage within a unit time becomes a value yielded by adding a predetermined value to the planned value.

\* \* \* \* \*